US010915053B2

(12) United States Patent
Ando

(10) Patent No.: US 10,915,053 B2
(45) Date of Patent: Feb. 9, 2021

(54) MANAGEMENT SYSTEM, MANAGEMENT METHOD, AND MANAGEMENT SERVER

(71) Applicant: CANON KABUSHIKI KAISHA, Tokyo (JP)

(72) Inventor: Keiichi Ando, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/507,293

(22) Filed: Jul. 10, 2019

(65) Prior Publication Data

US 2020/0026230 A1    Jan. 23, 2020

(30) Foreign Application Priority Data

Jul. 17, 2018    (JP) ................................ 2018-134264

(51) Int. Cl.
*G03G 15/00*    (2006.01)
*G06F 3/12*    (2006.01)
*H04N 1/00*    (2006.01)

(52) U.S. Cl.
CPC .......... *G03G 15/553* (2013.01); *G06F 3/121* (2013.01); *G06F 3/1219* (2013.01); *G06F 3/1237* (2013.01); *H04N 1/00644* (2013.01)

(58) Field of Classification Search
None
See application file for complete search history.

(56) References Cited

U.S. PATENT DOCUMENTS

| 9,042,750 B2 | 5/2015 | Kaneko ................ G03G 15/556 |
| 2005/0058468 A1* | 3/2005 | Reynolds ............... G03G 21/02 |
| | | 399/79 |
| 2007/0122166 A1* | 5/2007 | Takahashi ........... C07D 519/00 |
| | | 399/24 |

(Continued)

FOREIGN PATENT DOCUMENTS

| EP | 1126391 | 8/2001 |
| JP | 2013-030153 | 2/2013 |
| JP | 2017-054155 | 3/2017 |

OTHER PUBLICATIONS

Extended European Search Report dated Oct. 24, 2019 in counterpart EP Application 19186228.3.

*Primary Examiner* — Sevan A Aydin
(74) *Attorney, Agent, or Firm* — Venable LLP

(57) ABSTRACT

A management system includes a printing apparatus replaceably holding a first and a second replaceable item, and a management server. The printing apparatus includes a transmission unit that transmits identification data indicating identification information on the printing apparatus and data including a value related to a usage amount of the second replaceable item. The management server includes an acquisition unit that acquires a value related to a previous usage amount of the second replaceable item from a memory based on the identification data from the printing apparatus. The management server includes a determination unit that makes a determination about a delivery instruction of the first replaceable item based on the value related to the usage (Continued)

amount of the second replaceable item, which is transmitted from the printing apparatus, and the value related to the previous usage amount of the second replaceable item, which is acquired from the memory.

12 Claims, 11 Drawing Sheets

(56) References Cited

U.S. PATENT DOCUMENTS

| | | | |
|---|---|---|---|
| 2007/0122167 A1* | 5/2007 | Sugiyama | G03G 15/5079 |
| | | | 399/24 |
| 2015/0346666 A1* | 12/2015 | Tanaka | G03G 15/5016 |
| | | | 399/81 |
| 2016/0286059 A1 | 9/2016 | Hitaka | H04N 1/00344 |
| 2017/0285568 A1* | 10/2017 | Nishiyama | G03G 21/1814 |

* cited by examiner

MANAGEMENT SYSTEM, MANAGEMENT METHOD, AND MANAGEMENT SERVER

BACKGROUND OF THE INVENTION

Field of the Invention

The present invention relates to a management system and a management method for a replaceable item used for a printing apparatus, and a management server used for the management system.

Description of the Related Art

There is a management system that manages a consumable item provided in a printing apparatus by means of a management server connected to the printing apparatus via a network. As the management system, Japanese Patent Laid-Open No. 2013-030153 discloses a system that, when a user replaces a consumable item used in a printing apparatus, informs a management server of a model number of the consumable item and an identification number assigned to the replaced consumable item. In this system, the management server uses the model number and identification number of the replaced consumable item to make arrangements for detection of replacement of the consumable item, delivery of the consumable item to a customer, and the like.

Japanese Patent Laid-Open No. 2017-54155 discloses a system that transmits an identification number of a consumable item used for an image forming device to a server via a network and delivers the consumable item if the identification number is not stored in a storage unit in the server.

However, the systems disclosed in Japanese Patent Laid-Open No. 2013-030153 and Japanese Patent Laid-Open No. 2017-54155 both manage individual consumable items using identification numbers assigned to consumable items used in a printer. That is, the systems cannot manage a consumable item to which no identification number is assigned. Accordingly, identification numbers should be assigned to consumable items to be managed. However, assignment of identification numbers to individual consumable items requires additional processing for assigning identification numbers in a production procedure of consumable items, which may lead to an increase in production cost.

SUMMARY OF THE INVENTION

The present invention aims to enable a management server to manage a replaceable item such as a consumable item without adding identification information to a replaceable item such as a consumable item used for a printing apparatus.

The present invention is a management system comprising: a printing apparatus replaceably holding a first replaceable item and a second replaceable item different from the first replaceable item; and a management server, the management system managing delivery of the first replaceable item, wherein the printing apparatus comprises a transmission unit configured to transmit identification data indicating identification information on the printing apparatus and data including a value related to a usage amount of the second replaceable item, and the management server comprises: an acquisition unit configured to acquire, from a memory, a value related to a previous usage amount of the second replaceable item, which is stored in the memory in association with the identification information, based on the identification data transmitted from the printing apparatus; and a determination unit configured to make a determination about a delivery instruction of the first replaceable item based on the value related to the usage amount of the second replaceable item, which is transmitted from the printing apparatus, and the value related to the previous usage amount of the second replaceable item, which is acquired from the memory.

The present invention is a management method of a system comprising: a printing apparatus replaceably holding a first replaceable item and a second replaceable item different from the first replaceable item; and a management server, the system managing delivery of the first replaceable item, the management method comprising: transmitting identification data indicating identification information on the printing apparatus and data including a value related to a usage amount of the second replaceable item; acquiring, from a memory, a value related to a previous usage amount of the second replaceable item, which is stored in the memory in association with the identification information, based on the identification data transmitted from the printing apparatus; and making a determination about a delivery instruction of the first replaceable item based on the value related to the usage amount of the second replaceable item, which is transmitted from the printing apparatus, and the value related to the previous usage amount of the second replaceable item, which is acquired from the memory.

The present invention is a management server managing delivery of a first replaceable item replaceably held in a printing apparatus, the management server comprising: a reception unit configured to receive identification data indicating identification information on the printing apparatus and data including a value related to a usage amount of a second replaceable item that is replaceably held in the printing apparatus and is different from the first replaceable item, which are transmitted from the printing apparatus; an acquisition unit configured to acquire, from a memory, a value related to a previous usage amount of the second replaceable item, which is stored in the memory in association with the identification information, based on the identification data transmitted from the printing apparatus; and a determination unit configured to make a determination about a delivery instruction of the first replaceable item based on the value related to the usage amount of the second replaceable item, which is transmitted from the printing apparatus, and the value related to the previous usage amount of the second replaceable item, which is acquired from the memory.

According to the present invention, a management server can manage a replaceable item such as a consumable item used for a printing apparatus without adding identification information to the replaceable item such as a consumable item.

Further features of the present invention will become apparent from the following description of exemplary embodiments with reference to the attached drawings.

DESCRIPTION OF THE EMBODIMENTS

Embodiments of the present invention will be described below in detail with reference to the accompanying drawings. It should be noted that the embodiments described below do not limit the claimed present invention and that not all combinations of features described in the embodiments are essential for the solution to the present invention.

First Embodiment

Figure 1:
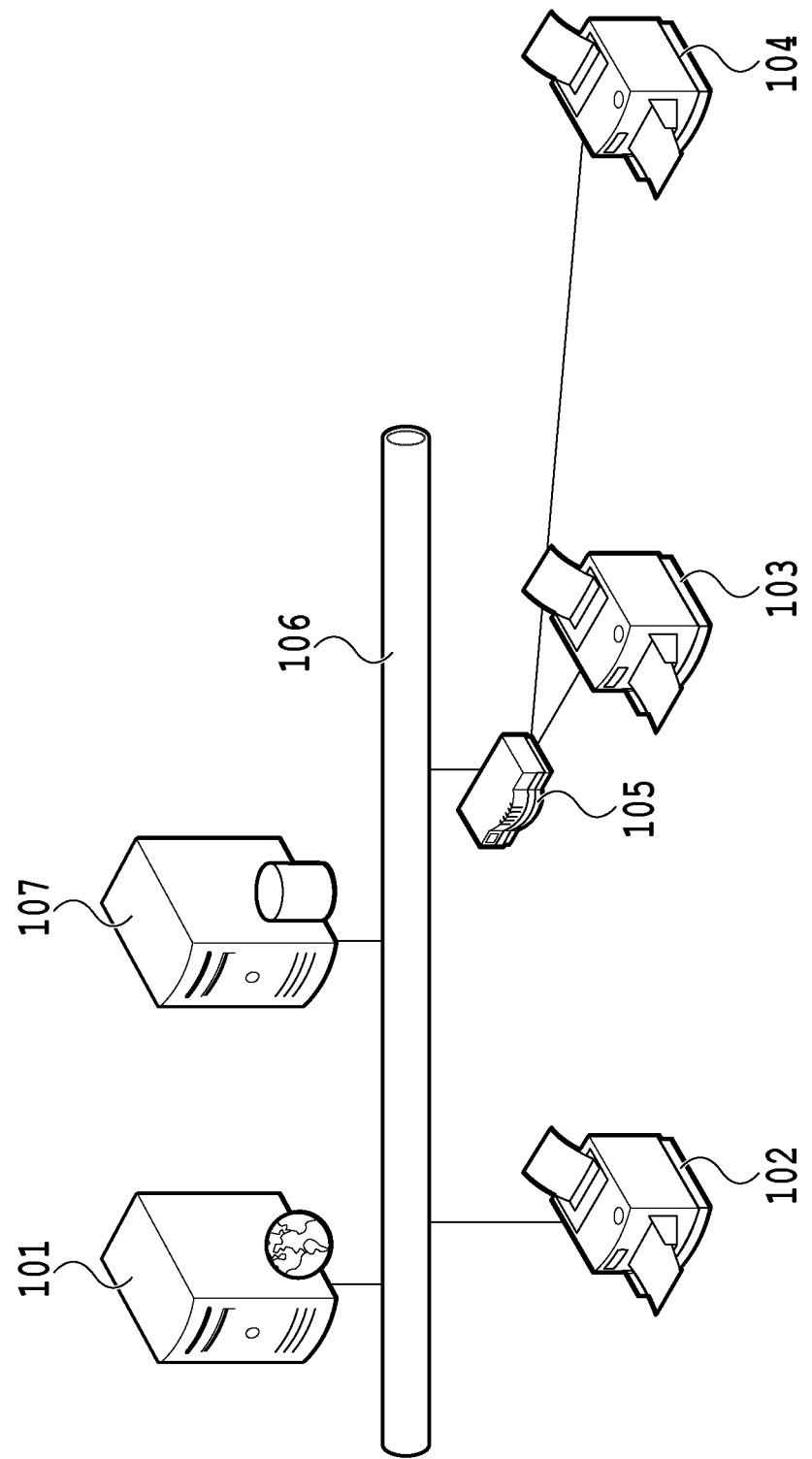
FIG. 1 is a diagram showing a configuration of a management system according to an embodiment.

FIG. 1 is a diagram showing a configuration of a management system according to the present embodiment. In FIG. 1, a management server 101 is directly connected to the Internet 106. A plurality of printing apparatuses (multifunction printers [MFPs]) 102, 103, and 104 are also connected to the Internet 106. The MFP 102 is directly connected to the Internet 106 and the MFPs 103 and 104 are connected to the Internet 106 via a router 105. Each of the MFPs 102, 103, and 104 has an individual identification ID (identification information) for identifying itself. The individual identification ID is a unique number such as a serial number assigned to each individual. That is, individual identification IDs of different individuals have different numbers even if the model is the same. The individual identification ID may include not only a number but also a character such as an alphabetic character. A service providing server 107 is further directly connected to the Internet 106. The service providing server 107 can communicate with the management server 101, MFPs 102, 103, and 104, and various servers and devices on the Internet via the Internet 106. FIG. 1 shows that the MFP 102 and the management server 101 are connected to each other via the Internet and information can be directly transmitted from the MFP 102 to the management server 101 via the Internet, but the present invention is not limited to this. For example, an unshown relay server may be provided so that information transmitted from the MFP 102 is temporarily collected and stored in the relay server via the Internet and transmitted from the relay server to the management server 101.

Next, the configuration of the management server 101 will be described with reference to the block diagram of FIG. 2. A CPU 202 executes processing such as operation, determination, and control of data and command according to software stored in a RAM 203, a ROM 204, or a hard disk 205. The RAM 203 is used as a temporary storage area in a case where the CPU 202 executes various types of processing. The hard disk 205 stores an operation system (OS), application software, a program and the like.

A display 206 comprises a liquid crystal display and a graphic controller and displays an object typified by a shortcut menu and a launcher including a plurality of objects such as images and icons, a GUI and the like.

An input device 207 is a device that enables a user to give various instructions to the management server 101 and includes, for example, a mouse and a keyboard. A system bus 208 enables data transmission and reception between the CPU 202 and the RAM 203, ROM 204, hard disk 205 and the like as information storage units. An I/F device (reception unit) 209 enables data transmission and reception between devices on the same network or Internet according to a protocol such as TCP/IP using a wireless or wired LAN conforming to a standard such as IEEE 802.11a.

Figure 2:
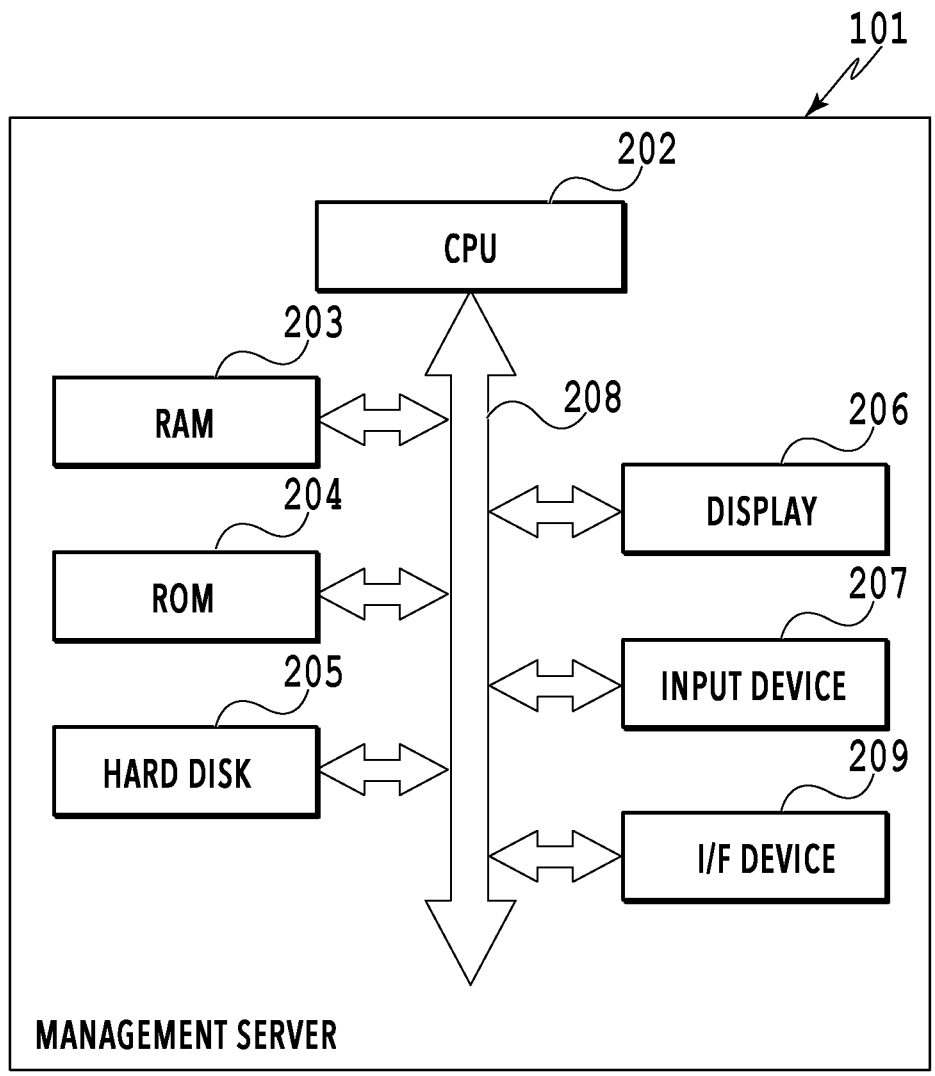
FIG. 2 is a block diagram showing a configuration of a management server in the embodiment.

FIG. 2 shows a case where the management server 101 is a so-called notebook personal computer (PC) in which the display 206 and the input device 207 are integrated with a control unit such as the CPU 202 and the RAM 203. However, the present invention is not limited to this. The PC may be a so-called desktop type in which the display and the input device are separate from each other or may be composed of a plurality of PCs. Further, the function of providing services may be realized by using a cloud server.

The service providing server 107 (external device) has the same configuration as that of the management server 101 except for a difference in application stored in the hard disk.

Figure 3:
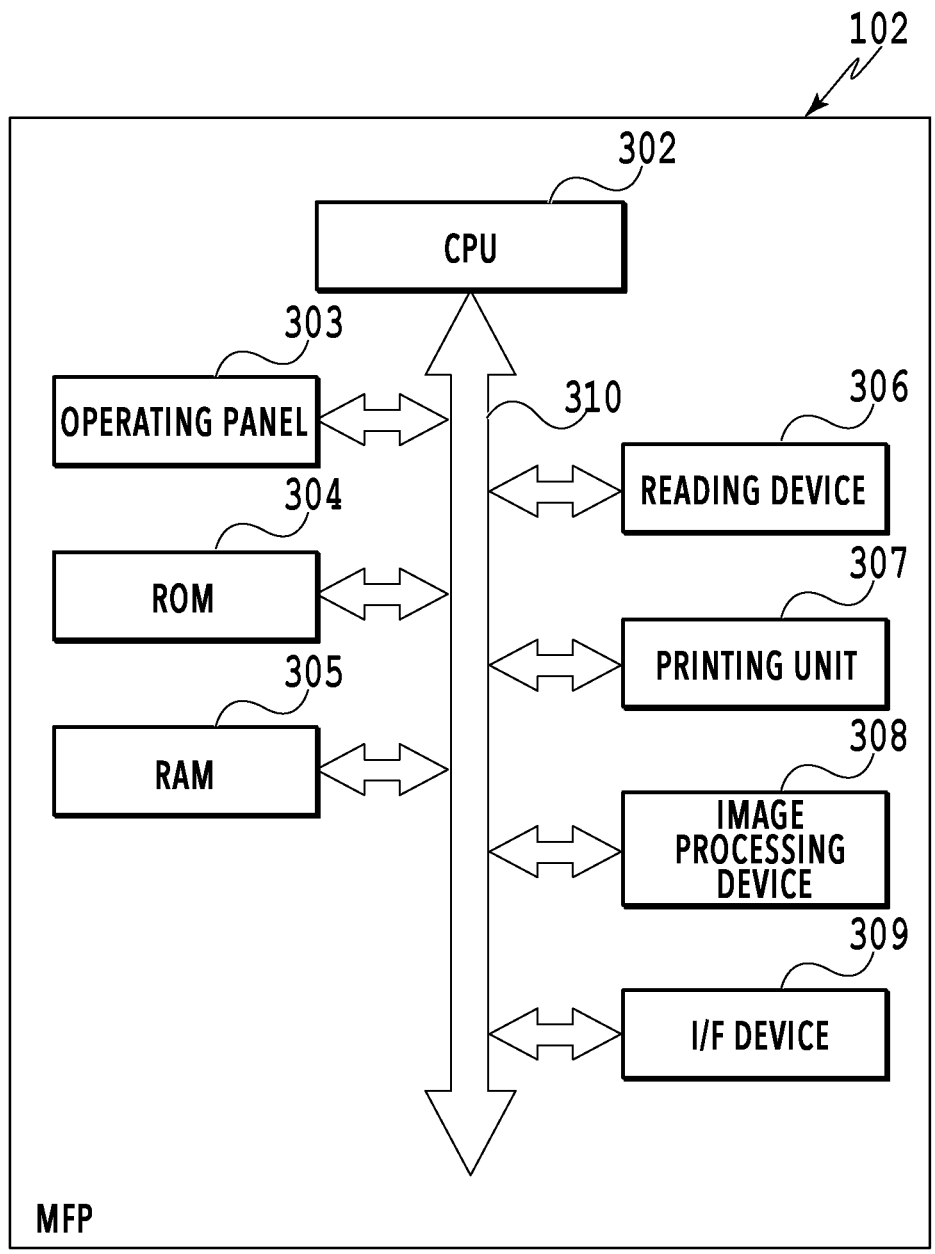
FIG. 3 is a block diagram showing a configuration of an MFP in the embodiment.

Next, the MFP 102 will be described with reference to the block diagram of FIG. 3. The MFP 102 comprises an operating panel 303, a ROM 304, a RAM 305, a reading device 306, a printing unit 307, an image processing device 308, an I/F device (transmitting unit) 309, and a system bus 310.

A CPU 302 controls the MFP 102 by executing a program stored in the ROM 304 on the RAM 305 according to user operation to the operating panel 303. The ROM 304 stores, for example, a control command program for the MFP 102. The RAM 305 serves as a working memory for the CPU 302 as described above, and is also used as a storage area for a spooler of print jobs. The RAM 305 is a nonvolatile memory for storing information obtained by the MFP 102.

The operating panel 303 comprises a key and touchpad for user operation and a display displaying a screen for providing a user with images and various types of information. The reading device 306 comprises an optical sensor for reading a document and expand image data read by the optical sensor on the RAM 305.

The printing unit 307 comprises a printing part that prints an image on a print sheet (print medium) as a second replaceable item and a conveying part that supplies/conveys the print sheet. The printing unit 307 in the present embodiment performs printing in an inkjet system in which ink is ejected from a print head to print an image on a print sheet.

The printing unit 307 is equipped with print heads that eject inks of different colors (printing material). The printing unit 307 is also equipped with a mounting unit for detachably mounting an ink tank (printing material storage container) storing inks of different colors to be supplied to the respective print heads.

In addition to the above, the printing unit 307 is equipped with a maintenance cartridge (first replaceable item) as a detachable, replaceable item. The maintenance cartridge is a collection container for collecting and storing waste ink (waste printing material) discharged from the print heads through maintenance operation executed for maintaining ejection performance of the print heads provided in the printing unit 307. The maintenance cartridge typically comprises an ink absorber such as a nonwoven fabric that absorbs waste ink. The waste ink is stored by the ink absorber. However, the maintenance cartridge may store waste ink therein without comprising the ink absorber. The maintenance operation includes, for example, recovery processing of applying a positive or negative pressure to the print heads to force ink to be discharged from ejection ports of the print heads and preliminary ejection, which is ejection of ink not contributing to print image formation from the print heads.

The reading device 306 reads a document image placed on the MFP 102 and comprises an optical sensor such as a CCD. The image processing device 308 executes image processing for printing a document read by the reading device 306 in the printing unit 307. The printing unit 307 performs printing in accordance with print data obtained through the image processing by the image processing device 308, thereby realizing the copy function.

The I/F device 309 enables data transmission and reception between devices connected to the same network or Internet according to a protocol such as TCP/IP using a wireless or wired LAN conforming to a standard of the IEEE 802.11 series (such as IEEE 802.11a and IEEE 802.11n).

Next, the flow of information processing executed by the CPU 302 of the MFP 102 will be described in accordance with the flowchart of FIG. 4.

Figure 4:
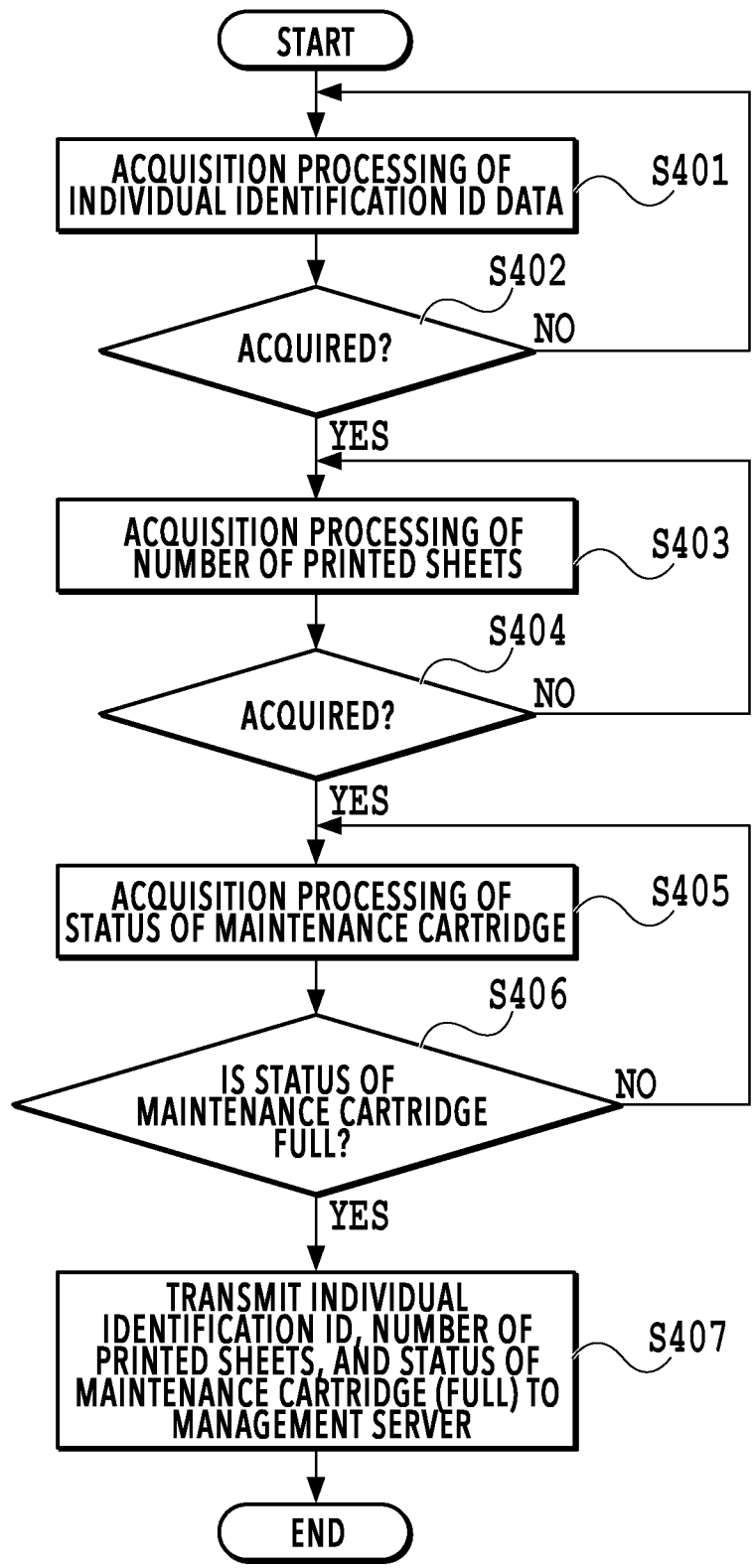
FIG. 4 is a flowchart showing information processing in an MFP in a first embodiment.

The CPU 302 provided in the MFP 102 executes processing shown by S401 to 407 in FIG. 4 using software stored in the ROM 304. In S401, the CPU 302 executes processing for acquiring data (identification data) indicating an individual identification ID of the MFP 102 and the like. Next, in S402, the CPU 302 determines whether the individual identification ID has been acquired. If the individual identification ID has not been acquired, the CPU 302 returns to S401 and executes the acquisition processing again in S401.

After that, in S403, the CPU 302 executes processing of acquiring data (printed sheet number data) indicating the number of printed sheets stored in the RAM 305. The number of printed sheets stored in the RAM (random access memory) 305 is a cumulative total of the number of sheets counted by the CPU 302 in response to printing operation by the printing unit 307 and indicates the amount of printing in the printing unit 307. The printed sheet number data is stored in the RAM 305. In S403, the number of printed sheets is acquired from the RAM 305.

Next, in S404, the CPU 302 determines whether the number of printed sheets has been acquired. If the CPU 302 determines that the number of printed sheets has not been acquired, the CPU 302 returns to S403 and executes the acquisition processing again. If the CPU 302 determines that the number of printed sheets has been acquired, the CPU 302 proceeds to S405.

In S405, the CPU 302 executes acquisition processing of acquiring data (status data) indicating a status of the maintenance cartridge mounted on the printing unit 307. The status of the maintenance cartridge means the amount of waste ink stored in the maintenance cartridge (storage amount of waste printing material) and corresponds to the status of a replaceable item.

If the storage amount of waste ink discharged to the maintenance cartridge exceeds the storage capacity of the maintenance cartridge, the status of the maintenance cartridge becomes full. In S406, the CPU 302 determines whether the status acquired in S405 is full. If the CPU 302 determines that the status is not full, the CPU 302 returns to S405 and executes the acquisition processing of the status data on the maintenance cartridge.

Various methods can be used to determine whether the status of the maintenance cartridge is full. For example, the amount of ink in the ink tank may be calculated based on the number of ink ejections from the print head corresponding to the maintenance cartridge, the number of times of recovery processing, and the like. If the calculated amount of ink exceeds a predetermined amount, the CPU 302 can determine that the status of the maintenance cartridge is full. Alternatively, a sensor that optically detects the storage level of ink stored in the maintenance cartridge may be provided. If the ink level in the maintenance cartridge exceeds a predetermined level based on the detection result, the CPU 302 can determine that the status of the maintenance cartridge is full. The former method is effective in a case where the ink absorber is provided in the maintenance cartridge and the latter method is effective in a case where the ink absorber is not provided in the maintenance cartridge.

If the CPU 302 determines that the status of the maintenance cartridge is full in S406, the maintenance cartridge is out of a continually usable status and requires replacement. In this case, the MFP 104 transmits management information to the management server 101 (S407) as information related to delivery of a replaceable item and the like. The management information transmitted to the management server 101 includes, for example, individual identification ID data, printed sheet number data, and status data indicating that the status of the maintenance cartridge is full. The same processing is also executed in the MFPs 103 and 104.

Figure 5:
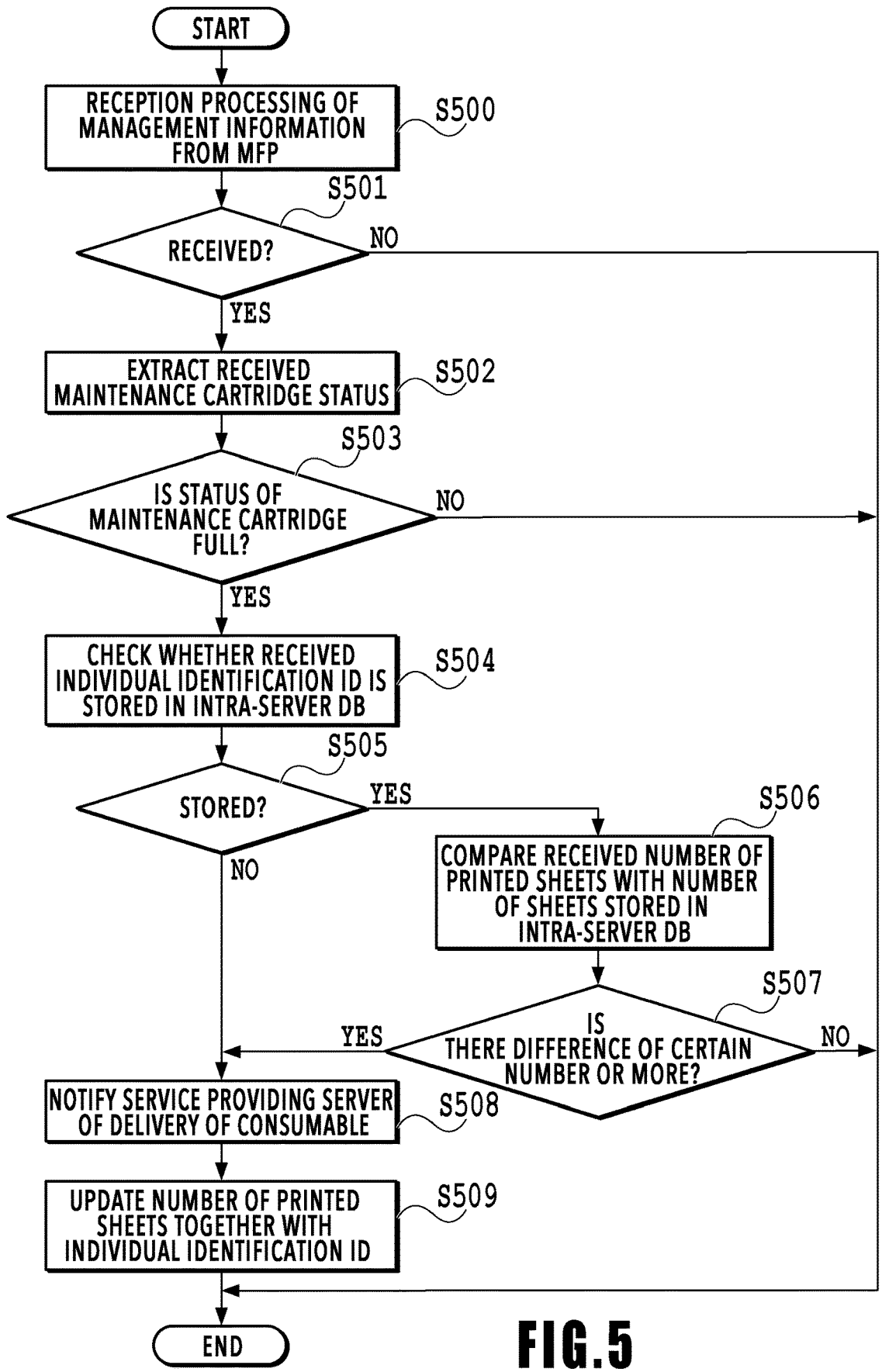
FIG. 5 is a flowchart showing information processing in a management server in the first embodiment.

Next, processing executed by the CPU 202 of the management server 101 will be described based on the flowchart of FIG. 5. The CPU 202 reads software stored in the hard disk 205 and executes processing of S500 to S509 shown in the flowchart of FIG. 5.

In S500, the CPU 202 executes reception processing of management information transmitted from the MFP 102, such as status data on the maintenance cartridge, printed sheet number data, and individual identification ID data assigned to the MFP 102. If the CPU 202 determines that reception information has been received from the MFP 102 through the reception processing (S501), the CPU 202 proceeds to the S502. If the CPU 202 determines that the information has not been received, the CPU 202 finishes the processing.

In S502, the CPU 202 extracts the status of the maintenance cartridge from the received management information. Next, in S503, the CPU 202 determines whether the extracted status of the maintenance cartridge is full. The CPU 202 finishes the processing if the maintenance cartridge is not full, and proceeds to S504 if the status of the maintenance cartridge is full.

Figure 6:
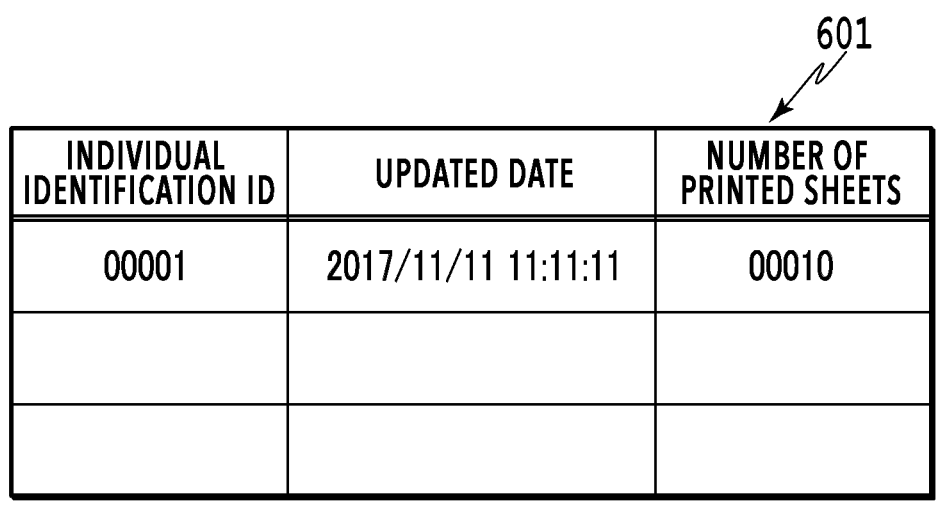
FIG. 6 is a diagram showing a database for individual identification ID management in the first embodiment.

In S504, the CPU 202 executes checking processing of whether the received individual identification ID is stored in an individual identification ID list in a database 601 (see FIG. 6) for individual identification ID management provided in the management server 101. As a result of the checking processing, if the CPU 202 determines that the received individual identification ID is stored in the database 601 in S505, the CPU 202 proceeds to S506. If the CPU 202 determines that the individual identification ID is not stored, the CPU 202 proceeds to S508.

It should be noted that when an MFP is first connected to the management system, an individual identification ID of the MFP is not stored in the individual identification ID list of the management server 101. In this case, individual identification ID data, sheet number data indicating the number of printed sheets associated therewith, and data indicating updated date are newly stored in the database 601 for individual identification ID management shown in FIG. 6 as an association list through the processing of S509 after the processing of S508 to be described later.

In S506, the CPU 202 compares the number of printed sheets (current number of printed sheets) indicated by printed sheet number data included in the received management information with the number of printed sheets (previous number of printed sheets) indicated by printed sheet number data already stored in the management server 101, and calculates a difference between the numbers. The previous number of printed sheets indicates the number of printed sheets indicated by printed sheet number data stored in the database 601 in a case where the status of a maintenance cartridge mounted and used immediately before the currently-used maintenance cartridge becomes full.

In S507, the CPU 202 determines whether the difference between the current number of printed sheets and the previous number of printed sheets is a certain number of sheets or more (certain value or more). If the CPU 202 determines that the difference between the current number of printed sheets and the previous number of printed sheets is the certain number of sheets or more, the CPU 202 proceeds to S508.

In S508, the CPU 202 provides the service providing server 107 with a notification for delivering the maintenance cartridge to an owner of the MFP 102. In response to the notification, the service providing server 107 instructs a delivery department to deliver the maintenance cartridge to the MFP 102. In response to the instruction, the delivery department delivers the maintenance cartridge to the owner of the MFP 102.

In S509, the management server 101 updates the printed sheet number data and the updated date data stored in association with the individual identification ID data in the individual identification ID list in the database 601 to the newest data, and finishes the processing.

If the CPU 202 determines that the difference is less than the certain number of sheets in S507, the CPU 202 determines that the status of the maintenance cartridge received from the MFP 102 is inappropriate and finishes the processing. The reason will be described below.

In general, after the status of a maintenance cartridge becomes full and the maintenance cartridge is replaced with a new maintenance cartridge, a certain number of sheets or more are printed until the status of the replaced maintenance cartridge becomes full. However, if the management server 101 receives status data indicating that the status of the maintenance cartridge after replacement becomes full before the number of printed sheets reaches the certain number of sheets after the maintenance cartridge is replaced, it is considered that some kind of abnormality occurs in the system. In addition, if a user removes a maintenance cartridge the status of which is full from the MFP 102 and then accidentally mounts it, data indicating that the status becomes full will be transmitted to the management server 101 again.

For that reason, if the CPU 202 determines that the difference between the current number of printed sheets (value related to a usage amount) and the previous number of printed sheets (value related to a previous usage amount) is less than the certain number of sheets in S507, the CPU 202 finishes the processing so as not to provide the service providing server 107 with a notification for instructing delivery of the maintenance cartridge. This can avoid needless delivery of the maintenance cartridge due to a system abnormality or accidental remounting of the maintenance cartridge the status of which is full. That is, the possibility of an accidental order and delivery of the maintenance cartridge can be reduced based on the status of the maintenance cartridge and the consumption status (printed sheet number) of sheets as a consumable item.

It should be noted that the MFP 102 may transmit the status of the maintenance cartridge when the status is near full, not full. At a time when the amount of waste ink stored in the maintenance cartridge exceeds a predetermined amount (amount less than the storage capacity), the status of the maintenance cartridge becomes near full. Accordingly, the CPU 302 may determine whether the status acquired in S405 is near full in S406 so that if the status is near full, the MFP 104 transmits the management information to the management server 101 in S407. Similarly, "full" may be replaced with "near full" in the subsequent processing.

According to the present embodiment, the management server can manage even a maintenance cartridge to which no identification number is assigned. This eliminates the need to assign identification numbers in the production process of maintenance cartridges and thus reduces the cost of manufacture of maintenance cartridges.

Second Embodiment

Next, the second embodiment of the present invention will be described. A management system according to the second embodiment also comprises the management server 101, the MFP 102, and the service providing server 107, like the first embodiment. However, the management system in the second embodiment manages an ink tank (printing material storage container), which is a consumable item, as a first replaceable item used in the MFPs 102, 103, and 104.

Figure 7:
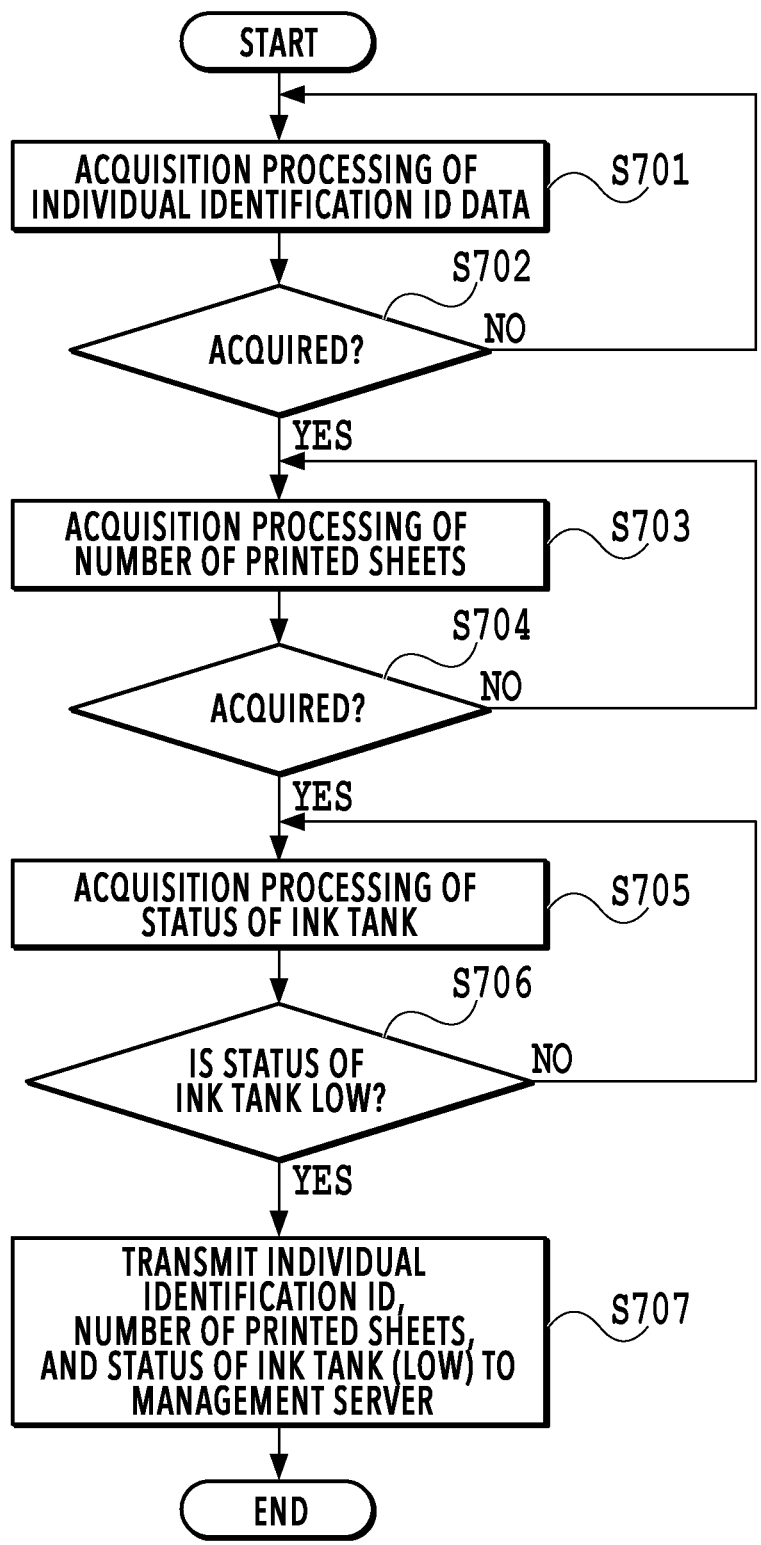
FIG. 7 is a flowchart showing processing in an MFP in a second embodiment.

FIG. 7 is a flowchart showing the flow of information processing executed by the CPU 302 of the MFP 102 in the second embodiment. The CPU 302 provided in the MFP 102 executes processing shown by S701 to S707 of FIG. 4 according to software stored in the ROM 304.

In S701 to S704, the CPU 302 executes acquisition processing of an individual identification ID assigned to the MFP 102 and acquisition processing of the number of sheets printed by the printing unit 307, etc., like S401 to S404 described in the first embodiment.

In S705, the CPU 302 executes acquisition processing of acquiring the status of an ink tank mounted on the printing unit 307. The ink tank is attachable to and detachable from the printing apparatus and stores therein ink to be supplied to the print head. In the present embodiment, the ink tank comprises a plurality of ink storage units independently storing inks of different colors. In a case where the ink tank is mounted on the mounting unit of the printing unit 307, ink in each ink storage unit is supplied to the corresponding print head.

The status of the ink tank acquired in S705 means the amount of ink (storage amount of printing material) stored in the ink tank and corresponds to the status of a replaceable item. If the amount of ink of at least one color out of the inks of different colors stored in the ink tank becomes less than a certain amount, the status of the ink tank becomes low. The amount of ink (certain amount) as a criterion for the status is preset to an arbitrary amount of zero or more.

After the acquisition processing of S705, the CPU 302 determines whether the acquired status is low in S706. If the status is not low, the CPU 302 returns to S705 and executes the acquisition processing of the status of the ink tank.

Various methods can be used to determine whether the status of the ink tank is low. For example, a sensor that optically detects the level of ink stored in the ink tank may be provided so as to determine whether the status of the ink tank is low based on the detection result. Alternatively, the amount of ink in the ink tank may be detected based on the number of ink ejections from the print head corresponding to the ink tank, the number of times of recovery processing, and the like so as to determine whether the status of the ink tank is low based on the detected amount of ink (status).

If the CPU 302 determines that the status of the ink tank is low in S706, the MFP 104 transmits management information to the management server 101 (S707). The management information transmitted to the management server 101 includes, for example, individual identification ID data, printed sheet number data, and status data (storage amount data) indicating that the status of the ink tank is low. The same processing is also executed in the MFPs 103 and 104.

Figure 8:
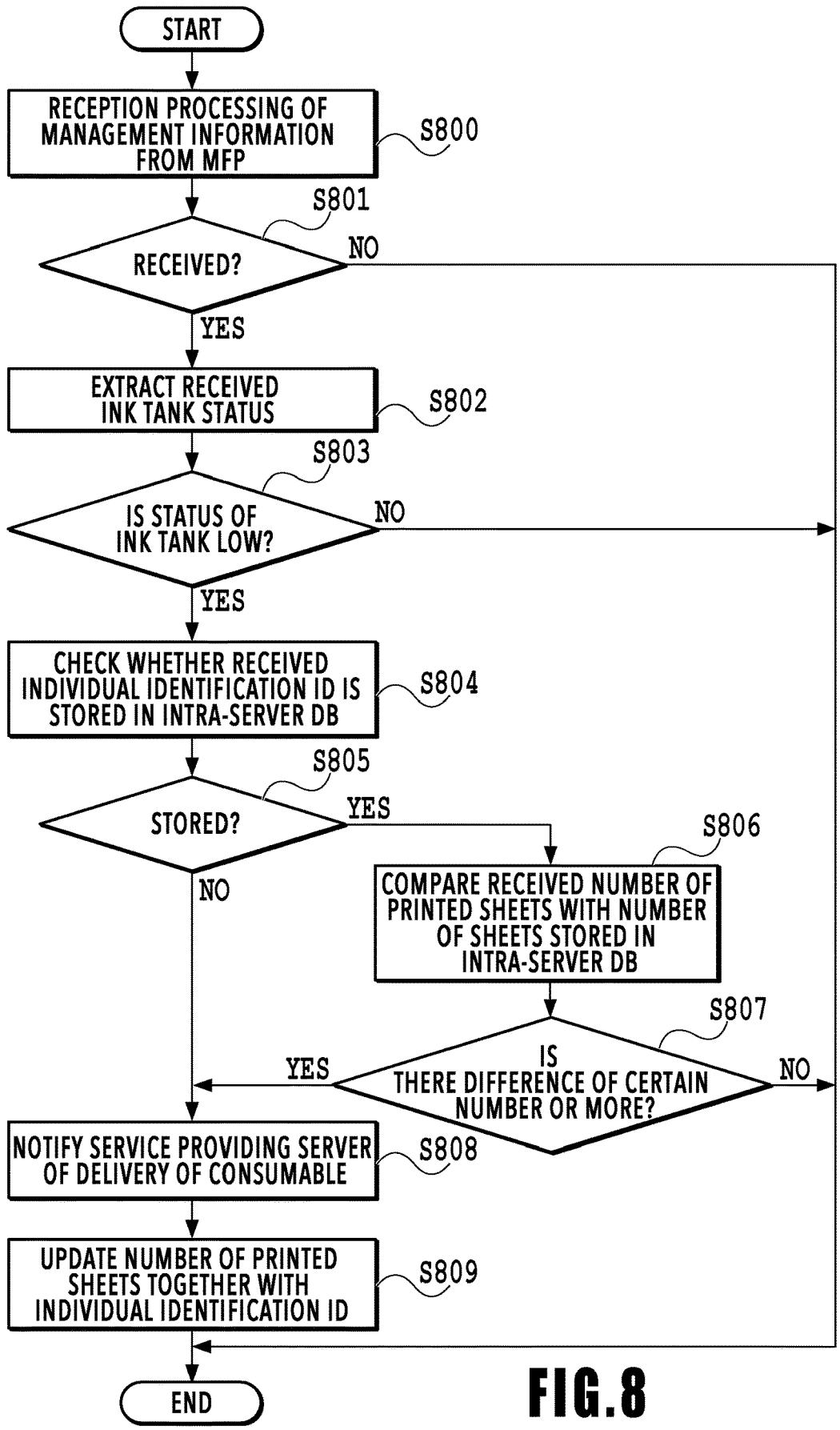
FIG. 8 is a flowchart showing information processing in a management server in the second embodiment.

Next, processing executed by the CPU 202 of the management server 101 will be described based on the flowchart of FIG. 8. The CPU 202 reads software stored in the hard disk 205 and executes processing of S800 to S809 shown in the flowchart of FIG. 8.

In S800, the CPU 202 executes reception processing of the status data on the ink tank (printing amount data), printed sheet number data, individual identification ID data on the MFP 102, and the like included in the management information transmitted from the MFP 102. In S801, the CPU 202 determines whether the management information transmitted from the MFP 102 has been received through the reception processing. If the CPU 202 determines that the information has not been received, the CPU 202 finishes the processing. If the CPU 202 determines that the information has been received, the CPU 202 proceeds to S802. Upon receipt of the management information from the MFP 102, the CPU 202 of the management server 101 stores printed sheet number data and updated date data associated with the received individual identification ID data as an association list in the database 601 for individual identification ID management shown in FIG. 6.

In S802, the CPU 202 extracts the status data on the ink tank from the received management information. Next, the CPU 202 determines whether the status of the ink tank is low based on the extracted status data (S803). If the CPU 202 determines that the status of the ink tank is not low, the CPU 202 finishes the processing. If the CPU 202 determines that the status of the ink tank is low, the ink tank is out of a continually usable status and requires replacement. In this case, the CPU 202 proceeds to S804.

In S804, like S504 in the first embodiment, the CPU 202 checks whether the received individual identification ID data is stored in the individual identification ID list stored in the database 601 for individual identification ID management. As a result of the checking, in S805, if the CPU 202 determines that the received individual identification ID data is stored in the database 601, the CPU 202 proceeds to S806. If the CPU 202 determines that the data is not stored, the CPU 202 proceeds to S808.

In S806, the CPU 202 compares the number of printed sheets (current number of printed sheets [usage amount]) indicated by printed sheet number data included in the received management information with the number of printed sheets (previous number of printed sheets [previous usage amount]) indicated by printed sheet number data already stored in the management server 101, and calculates a difference between the numbers. The previous number of printed sheets indicates the number of printed sheets indicated by printed sheet number data stored in the database 601 in a case where the status of an ink tank used immediately before the currently-used ink tank becomes low.

In S807, the CPU 202 determines whether the difference between the current number of printed sheets and the previous number of printed sheets is the certain number of sheets or more (certain value or more). If the CPU 202 determines that the difference between the current number of printed sheets and the previous number of printed sheets is the certain number of sheets or more, the CPU 202 proceeds to S808.

In S808, the CPU 202 provides the service providing server 107 with a notification for delivering the ink tank to an owner of the MFP 102. In response to the notification, the service providing server 107 instructs a delivery department to deliver the ink tank to the MFP 102. In response to the instruction, the delivery department delivers the ink tank to the owner of the MFP 102.

After that, in S809, the CPU 202 updates the printed sheet number data and the updated date data stored in association with the individual identification ID data in the individual identification ID list in the database 601 to the newest data and finishes the processing.

If the CPU 202 determines that the difference is less than the certain number of sheets in S807, the CPU 202 determines that an abnormality occurs in the system or the ink tank the status of which is low is removed and then accidentally remounted, and finishes the processing.

That is, after the status of an ink tank becomes low and the ink tank is replaced with a new ink tank, a certain number of sheets or more are printed until the status of the replaced ink tank becomes low. Accordingly, if the management server 101 receives status data indicating that the status of the ink tank after replacement becomes low before the number of printed sheets reaches the certain number of sheets after the ink tank is replaced, there is a possibility that some kind of abnormality occurs in the system. In addition, if an ink tank the status of which is low is accidentally remounted on the MFP 102, data indicating that the status becomes low will be transmitted to the management server 101 again.

For that reason, if the CPU 202 determines that the difference between the current number of printed sheets and the previous number of printed sheets is less than the certain number of sheets in S807, the CPU 202 finishes the processing so as not to provide the service providing server 107 with a notification for instructing delivery of the ink tank. This can avoid needless delivery of the ink tank due to a system abnormality or accidental remounting of the ink tank the status of which is low. That is, the possibility of an accidental order and delivery of the ink tank can be reduced based on the status of the ink tank and the consumption amount (printed sheet number) of sheets as a consumable item.

In addition, according to the present embodiment, the management server can manage even an ink tank to which no identification number is assigned. This reduces the cost of manufacture of ink tanks caused by assigning identification numbers.

Third Embodiment

Next, the third embodiment of the present invention will be described. A management system according to the third embodiment also comprises the management server 101, the MFPs 102, 103, and 104, and the service providing server 107, like the first embodiment. However, the third embodiment is different from the first embodiment in that the management system according to the third embodiment manages a maintenance cartridge as a replaceable item used for the MFPs 102, 103, and 104 based on a change in the amount of ink stored in the ink tank.

Figure 9:
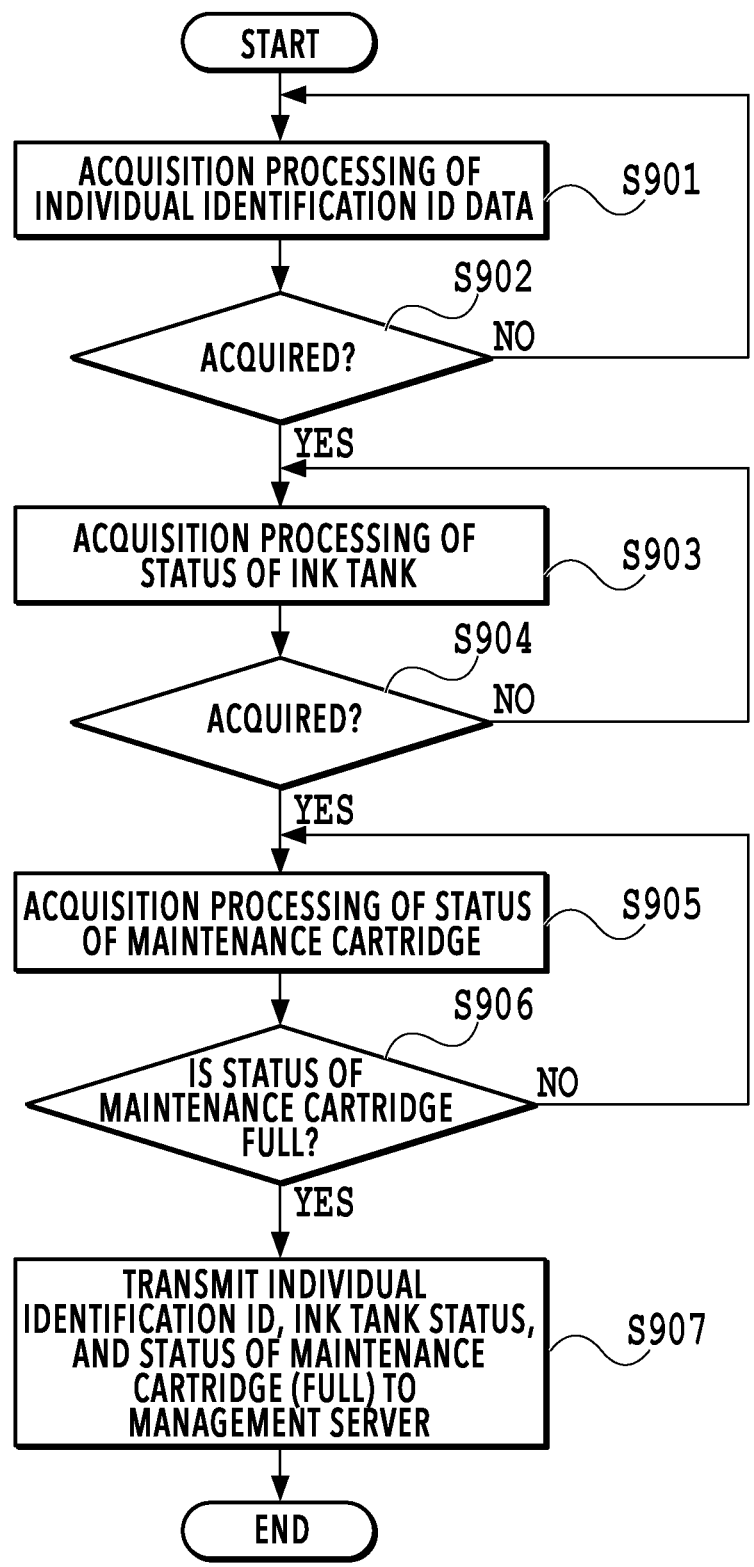
FIG. 9 is a flowchart showing information processing in an MFP in a third embodiment.

FIG. 9 is a flowchart showing the flow of information processing executed by the CPU 302 of the MFP 102 in the third embodiment. The CPU 302 provided in the MFP 102 executes processing shown by S901 to S907 of FIG. 9 according to software stored in the ROM 304.

In S901 and S902, the CPU 302 executes acquisition processing of the individual identification ID assigned to the MFP 102 like S401 and S402 described in the first embodiment. After that, in S903, the CPU 302 executes processing of acquiring the status of the ink tank, that is, ink amount data indicating the amount of ink stored in the ink tank. In the present embodiment, the status of the ink tank becomes full in a case where a maximum amount of ink is stored in the ink tank. The amount of ink stored in the ink tank changes (decreases or increases) with the progress of printing operation or the replacement of the ink tank. Thus, a change in the amount of ink stored in the ink tank indicates a change in the amount of printing.

The CPU 302 of the MFP 102 stores the status of the ink tank in the RAM 305 at any time in a case where the printing unit 307 performs printing. In S903, the CPU 302 executes acquisition processing of the amount of ink stored in the RAM 305. The amount of ink in the ink tank can be detected by the methods described in the second embodiment.

In S904, the CPU 302 determines whether the ink status has been acquired in the acquisition processing in S903. If the status has not been acquired, the CPU 302 returns to S903 and executes the acquisition processing again. If the status has been acquired, the CPU 302 proceeds to S905.

In S905, the CPU 302 executes processing of acquiring the status of the maintenance cartridge, that is, the amount of waste ink (storage amount of waste printing material) stored in the maintenance cartridge. In the present embodiment, the amount of waste ink corresponds to the status of a replaceable item.

After that, in S906, the CPU 302 determines whether the status acquired in S905 is full, that is, whether the amount of waste ink exceeds a predetermined absorbing capacity. If the CPU 302 determines that the status is not full, the CPU 302 returns to S905 and executes acquisition processing of the status of the maintenance cartridge.

If the CPU 302 determines that the status of the maintenance cartridge is full in S906, the maintenance cartridge is out of a continually usable status and requires replacement. In this case, the MFP 102 transmits management information to the management server 101 (S907). The management information includes, for example, individual identification ID data, status data on the ink tank (printing amount data), and data indicating that the status of the maintenance cartridge is full. Although the MFP 102 has been described as an example, the same processing is also executed in the MFPs 103 and 104.

Figure 10:
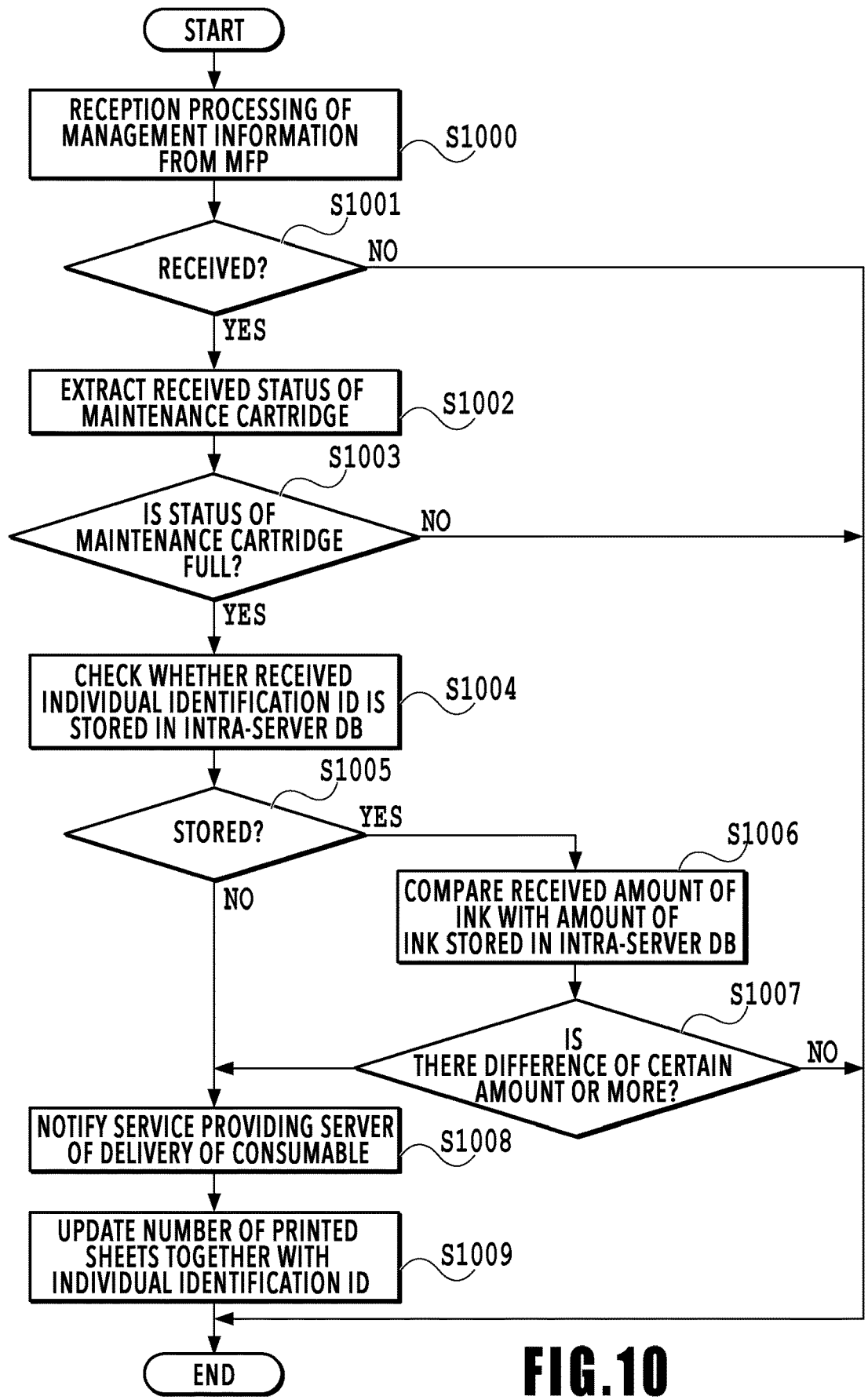
FIG. 10 is a flowchart showing information processing in a management server in the third embodiment.

Next, processing executed by the CPU 202 of the management server 101 will be described based on the flowchart of FIG. 10. The CPU 202 reads software stored in the hard disk 205 and executes processing of S1000 to S1009 shown in the flowchart of FIG. 10.

In S1000, the CPU 202 executes reception processing of status data on the ink tank (printing amount data), status data on the maintenance cartridge, printed sheet number data, individual identification ID data assigned to the MFP 102 and the like included in the management information transmitted from the MFP 102. In S1001, the CPU 202 determines whether the management information transmitted from the MFP 102 has been received through the reception processing. If the CPU 202 determines that the information has not been received, the CPU 202 finishes the processing.

Figure 11:
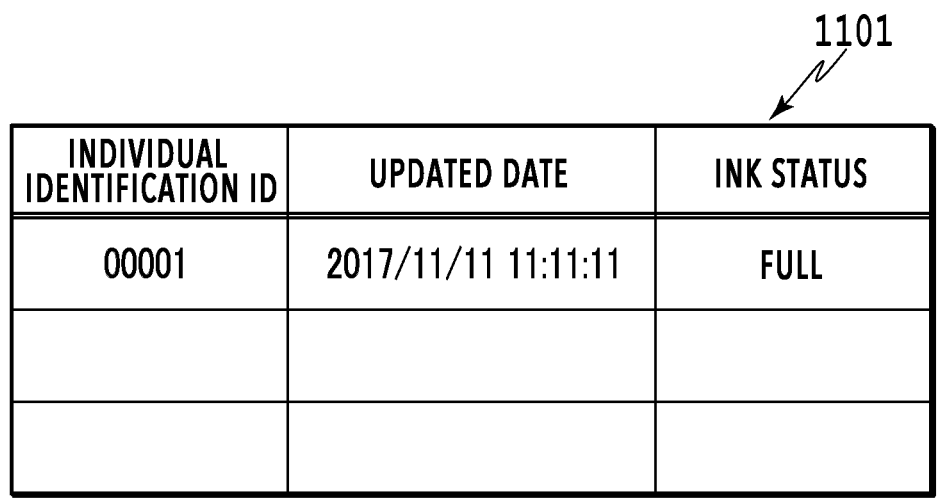
FIG. 11 is a diagram showing a database for individual identification ID management in the third embodiment.

If the CPU 202 determines that the information has been received, the CPU 202 proceeds to S1002. Upon receipt of the management information from the MFP 102, the CPU 202 of the management server 101 stores the status of the ink tank (printing amount) and the updated date associated with the received individual identification ID together as an association list in a database 1101 for individual identification ID management in FIG. 11.

In S1002, the CPU 202 extracts the status of the maintenance cartridge from the received data. The CPU 202 then determines whether the extracted status of the maintenance cartridge is full (S1003). If the CPU 202 determines that the status of the maintenance cartridge is not full, the CPU 202 finishes the processing. If the CPU 202 determines that the status of the maintenance cartridge is full, the CPU 202 proceeds to S1004.

In S1004, the CPU 202 checks whether the received individual identification ID data is stored in the individual identification ID list stored in the database 1101 for individual identification ID management. As a result of the checking, in S1005, if the CPU 202 determines that the received individual identification ID is stored in the database 601, the CPU 202 proceeds to S1006. If the CPU 202 determines that the individual identification ID is not stored, the CPU 202 proceeds to S1008.

In S1006, the CPU 202 compares the amount of ink in the ink tank (current amount of ink) indicated by the management information received from the MFP 102 with the amount of ink (previous amount of ink) indicated by ink amount data already stored in the management server 101, and calculates a difference between the amounts. The previous amount of ink indicates the amount of ink indicated by ink amount data stored in the database 601 in a case where the status of a maintenance cartridge used immediately before the currently-used maintenance cartridge becomes full.

In S1007, the CPU 202 determines whether the difference between the current amount of ink and the previous amount of ink is a certain amount or more. If the CPU 202 determines that the difference is the certain amount or more, the CPU 202 proceeds to S1008.

In S1008, the CPU 202 provides the service providing server 107 with a notification for delivering the maintenance cartridge to an owner of the MFP 102. In response to the notification, the service providing server 107 instructs a delivery department to deliver the maintenance cartridge to the MFP 102. In response to the instruction, the delivery department delivers the maintenance cartridge to the owner of the MFP 102.

In S1009, the CPU 202 updates the printed sheet number data and the updated date data associated with the individual identification ID in the individual identification ID list in the database 1101 provided in the management server 101 to the newest data and finishes the processing.

If the CPU 202 determines that the difference is less than a certain amount in S1007, the CPU 202 determines that an abnormality occurs in the system or the maintenance cartridge the status of which is full is removed and then accidentally remounted, and finishes the processing. Thus, the CPU 202 does not provide the service providing server 107 with a notification for instructing delivery of the maintenance cartridge.

That is, after the maintenance cartridge is replaced, the certain amount of ink or more is consumed until the maintenance cartridge becomes full next. Accordingly, if the management server 101 receives data indicating that the status after replacement becomes full before the amount of ink consumption in the ink tank reaches the certain amount after the maintenance cartridge is replaced, there is a possibility that some kind of abnormality occurs in the system. In addition, if a maintenance cartridge the status of which is full is accidentally remounted on the MFP 102, data indicating that the status becomes full will be transmitted to the management server again.

For that reason, if the CPU 202 determines that the difference between the current amount of ink and the previous amount of ink is less than the certain amount in S1007, the CPU 202 finishes the processing so as not to provide the service providing server 107 with a notification for instructing delivery of the maintenance cartridge. This can avoid needless delivery of the maintenance cartridge due to a system abnormality or accidental remounting of the full maintenance cartridge. That is, the possibility of an accidental order of the maintenance cartridge can be reduced based on the status of the maintenance cartridge and the consumption status (amount of ink consumption) of the ink tank as a replaceable item.

In addition, according to the present embodiment, the management server can manage even a maintenance cartridge to which no identification number is assigned. This suppresses an increase in the cost of maintenance cartridges caused by assigning identification numbers.

OTHER EMBODIMENTS

In the above embodiments, the integral ink tank comprising a plurality of ink storage units storing inks of different colors is used and the status of the ink tank becomes low if the amount of ink of at least one color is equal to or less than a certain amount. However, the present invention is also applicable to a printing apparatus in which a plurality of ink tanks are independently attachable and detachable. In this case, the maintenance cartridge or ink tank as the first replaceable item can be properly managed like the embodiments by transmitting the status (ink amount) of each ink tank to the management server.

In the above embodiments, the printing apparatus using the inkjet system is described as an example. However, the present invention is also applicable to printing apparatuses that print images using printing systems other than the inkjet system. For example, the present invention is applicable to an electrophotographic printing apparatus that prints images by using toner as printing material. In the case of the electrophotographic printing apparatus, a replaceable item to be managed is, for example, a toner cartridge or waste toner box that is a replaceable item detachably mounted on the printing apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-134264, filed Jul. 17, 2018, which is hereby incorporated by reference wherein in its entirety.

What is claimed is:

1. A management system comprising: a printing apparatus replaceably holding a first replaceable item and a second replaceable item different from the first replaceable item; and a management server, the management system managing delivery of the first replaceable item,
   wherein the printing apparatus comprises at least one processor causing the printing apparatus to act as:
   a transmission unit configured to transmit identification data, status data and a value, wherein the identification data indicates identification information on the printing apparatus, the status data relates to a status of the first replaceable item that has been held in the printing apparatus, and the value relates to a usage amount of the second replaceable item, and
   wherein the management server comprises at least one processor causing the management server to act as:
   a determination unit configured to perform determination processing for determining whether the status of the first replaceable item is a predetermined status based on the status data transmitted from the printing apparatus,
   an acquisition unit configured to acquire, using the identification data transmitted from the printing apparatus, a value related to a previous usage amount of the second replaceable item, which is associated with identification information in a memory of the management server;
   a comparing unit configured to perform comparing processing for comparing the value related to the usage amount of the second replaceable item, which is transmitted from the printing apparatus, with the value related to the previous usage amount of the second replaceable item, which is acquired from the memory of the management server, and
   an issuing unit configured to perform issuing control for a delivery instruction of a new first replaceable item based on the determination processing and the comparing processing.

2. The management system according to claim 1, wherein the comparing unit calculates a difference between the value related to the usage amount of the second replaceable item, which is transmitted from the printing apparatus, and the value related to the previous usage amount of the second replaceable item, which is acquired from the memory of the management server, and in a case where the calculated difference exceeds a certain value, the issuing unit issues a delivery instruction of the new first replaceable item, and in a case where the calculated difference does not exceed the certain value, the issuing unit does not issue the delivery instruction of the new first replaceable item.

3. The management system according to claim 2, wherein the transmission unit transmits data including a value related to a number of printed sheets of a print medium used by the printing apparatus, as data including the value related to the usage amount of the second replaceable item, and the comparing unit calculates a difference between the value related to the number of printed sheets of the print medium, which is transmitted from the printing apparatus, and a value related to a previous number of printed sheets of the print medium, which is acquired from the memory.

4. The management system according to claim 2, wherein the transmission unit transmits data including a value related to a storage amount of printing material stored in the printing material storage container held in the printing apparatus as data including the value related to the usage amount of the second replaceable item, and the comparing unit calculates a difference between the value related to the storage amount of printing material, which is transmitted from the printing apparatus, and a value related to a previous storage amount of printing material, which is acquired from the memory.

5. The management system according to claim 2, wherein in a case where the calculated difference exceeds a certain value, a notification for delivering the first replaceable item to an owner of the printing apparatus is transmitted to an external device.

6. The management system according to claim 5, wherein the external device is a service providing server provided communicably with the management server, and the service providing server receives the notification transmitted from the management server and transmits a delivery instruction to a delivery department that delivers the first replaceable item to the owner of the printing apparatus.

7. The management system according to claim 1, wherein the first replaceable item is a maintenance cartridge for collecting waste printing material discharged along with maintenance operation of the printing apparatus, and the status data is data related to a storage amount of waste printing material in the maintenance cartridge.

8. The management system according to claim 1, wherein the first replaceable item is a printing material storage container storing printing material used for printing operation of the printing apparatus, and the status data is storage amount data related to a storage amount of printing material in the printing material storage container.

9. The management system according to claim 1, wherein a plurality of printing apparatuses each having individual identification information are provided communicably with the management server, and wherein each of the plurality of printing apparatuses transmits respective ones of identification data, status data and a value, to the management server.

10. The management system according to claim 1, wherein the first replaceable item is not provided with identification information for identifying an individual.

11. A management method of a system comprising: a printing apparatus replaceably holding a first replaceable item and a second replaceable item different from the first replaceable item; and a management server, the system managing delivery of the first replaceable item, the management method comprising:

transmitting identification data, status data and a value, wherein the identification data indicates identification information on the printing apparatus, the status data relates to a status of the first replaceable item that has been held in the printing apparatus, and the value relates to a usage amount of the second replaceable item;

determining whether the status of the first replaceable item is a predetermined status based on the status data transmitted from the printing apparatus;

acquiring, using the identification data transmitted from the printing apparatus, a value related to a previous usage amount of the second replaceable item, which is associated with identification information in a memory of the management server;

comparing the value related to the usage amount of the second replaceable item, which is transmitted from the printing apparatus, with the value related to the previous usage amount of the second replaceable item, which is acquired from the memory of the management server; and performing issuing control for a delivery instruction of a new first replaceable item based on the determination processing and the comparing processing.

12. A management server managing delivery of a first replaceable item replaceably held in a printing apparatus, wherein the management server comprises at least one processor causing the management server to act as:

a reception unit configured to receive identification data indicating identification information on the printing apparatus, status data related to a status of the first replaceable item that has been held in the printing apparatus, and a value related to a usage amount of a second replaceable item that is replaceably held in the printing apparatus and is different from the first replaceable item, which are transmitted from the printing apparatus;

a determination unit configured to perform determination processing for determining whether the status of the first replaceable item is a predetermined status based on the status data transmitted from the printing apparatus;

an acquisition unit configured to acquire, using the identification data transmitted from the printing apparatus, a value related to a previous usage amount of the second replaceable item, which is associated with identification information in a memory of the management server;

a comparing unit configured to perform comparing processing for comparing the value related to the usage amount of the second replaceable item, which is transmitted from the printing apparatus, with the value related to the previous usage amount of the second replaceable item, which is acquired from the memory of the management server; and an issuing unit configured to perform issuing control for a delivery instruction of a new first replaceable item based on the determination processing and the comparing processing.

* * * * *